United States Patent [19]
Reinhardt

[11] Patent Number: 6,162,042
[45] Date of Patent: Dec. 19, 2000

[54] ROTARY MOLDING SYSTEM

[75] Inventor: Eugen Reinhardt, Villingen-Schwenningen, Germany

[73] Assignee: Ernst Reinhard GmbH, Villingen-Schwenningen, Germany

[21] Appl. No.: 09/013,391

[22] Filed: Jan. 26, 1998

[30] Foreign Application Priority Data

Jan. 24, 1997 [DE] Germany .......................... 197 02 469

[51] Int. Cl.⁷ ................................................ B29C 41/06
[52] U.S. Cl. ..................... 425/435; 425/429; 425/454; 425/DIG. 201
[58] Field of Search ................... 425/429, 435, 425/430, 434, 454, DIG. 201

[56] References Cited

U.S. PATENT DOCUMENTS

| | | | |
|---|---|---|---|
| 3,822,980 | 7/1974 | Graeper | 425/429 |
| 4,102,624 | 7/1978 | Corona | 425/429 |
| 4,292,015 | 9/1981 | Hritz | 425/429 |
| 5,039,297 | 8/1991 | Masters | 425/429 |

FOREIGN PATENT DOCUMENTS

| | | |
|---|---|---|
| 0-177906 | 4/1985 | European Pat. Off. . |
| 0 177 906 A2 | 10/1985 | European Pat. Off. . |
| 2-059107 | 12/1970 | Germany . |
| 2059107 | 10/1971 | Germany . |
| 1334331 | 2/1972 | United Kingdom . |

OTHER PUBLICATIONS

Wildfeuer, E., "Rotary Molds—An Overview of the Technology Used in the Process", Plaste und Kautschuk, vol. 21, No. 3, 1974, pp. 203–207.

E. Wildfeuer, "Rotationsformen—Verfahrenstechnische Ubersicht", Plastverabeitung Und Anwendung, Plaste und Kautschuk, 21 Jahrgang, Heft Mar., 1974.

Wildfeuer, E., "Rotationsformen—Verfahrenstechnische Ubersicht", ????? Germany, 1974.

*Primary Examiner*—Tim Heitbrink
*Assistant Examiner*—Donald Heckenberg
*Attorney, Agent, or Firm*—Foley, Hoag & Eliot LLP

[57] ABSTRACT

A rotary molding system has a sintering furnace, at least one cooling chamber, and at least one transport device to receive at least one mold carrier and to transport the mold carrier between the sintering furnace and the at least one cooling chamber. The sintering furnace and the cooling chamber(s) have rotary devices to receive the mold carrier. In particular, the sintering furnace and the cooling chamber(s) are arranged serially, with the transport device designed as a mold carrier carriage moving beneath the sintering furnace and the cooling chambers.

12 Claims, 6 Drawing Sheets

ROTARY MOLDING SYSTEM

FIELD OF THE INVENTION

The present invention relates to a rotary molding system with a sintering furnace, at least one cooling chamber, and at least one transport means to receive at least one molded body and to transport said body between the sintering furnace and the at least one cooling chamber.

BACKGROUND OF THE INVENTION

Systems of this type are used to manufacture hollow plastic bodies in hollow molds that are held by the mold supports. During the manufacturing process, the hollow molds are filled with plastic powder or sintered powder and heated in the sintering furnace while performing a rotary movement. Following melting and uniform distribution of the powder in the hollow mold, the mold support is delivered by the transport means to the cooling chamber, where the hollow mold is cooled while continuing to perform a rotary movement.

A rotary molding system of this type is known from UK 1 334 331. The system described has cooling chambers arranged in a circle around a rotating transport means, as well as a sintering furnace. The transport means which operates in the manner of a carousel has four arms to receive mold supports, said arms being moved by a rotary motion of the transport means between the individual stations of the manufacturing process. The sintering furnace can be moved in the radial direction to surround one of the mold supports fastened to the arms. During the melting process, the sintering furnace surrounds the mold support on only five sides; a flap on the sintering furnace must remain open during the melting process because of the rigid arm of the transport means, resulting in high energy losses during the melting process.

A rotary mold system is known from EP 01 77 906 A2 in which a plurality of cooling chambers is arranged in a circle around a sintering furnace and in which a tool carrier that can move on rails between the cooling chambers and the sintering furnace serves as the transport means. The system suffers from the disadvantages that it takes up considerable space because of the circular arrangement of the cooling chambers around the sintering furnace, and that the heating chamber must either be made so large that the mold supports together with the transport means can be accepted or that the sintering furnace once again cannot be closed completely, with a portion of the transport means remaining outside.

Another device of this type is known from Wildfeuer, E.: "Rotationsformen_Verfahrenstechnische Übersicht [Rotary Molds_An Overview of the Technology Used in the Process]", Plaste und Kautschuk, Vol. 21, No. 3, 1974, pages 203 to 207. In this article, a rotary system with cooling chambers arranged in series with a heating chamber is described, with tool carriers serving as transport means that move on a rail next to the cooling chambers and the heating chamber, and which have telescopic arms for inserting a rotary molding tool into the cooling chambers and/or heating chambers. Here again it is not possible to close the heating chambers completely because of the telescoping arms of the transport means. In addition, a number of transport means is always required that is equal to the number of mold carriers used in the manufacturing process.

The object of the present invention therefore is to provide a rotary molding system that can be made compact and operates with optimum utilization of the energy supplied. In addition the disadvantages described in conjunction with known rotary molding systems should be overcome.

SUMMARY OF THE INVENTION

This object is achieved by a rotary molding system described at the outset in which the sintering furnace and the at least one cooling chamber have first rotary devices to receive the mold carriers.

The mold carriers can be inserted completely into the inserting furnace and/or the cooling chambers, and the sintering furnace and/or the cooling chambers can be closed completely during the melting and/or cooling process. The latter aspect results in optimum utilization of the energy employed for heating or cooling. In addition the transport means that serve to transport the mold carrier between the cooling chambers and the sintering furnace can be used to transport additional mold carriers while an individual mold carrier is in the sintering furnace or the cooling chamber. This results in a reduction of the total cost of the rotary molding system.

Advantageously, the sintering furnace and two cooling chambers as well as a station for removal from the mold are arranged in an essentially straight line. As a result, an especially compact design is obtained for the rotary molding system according to the invention.

According to another embodiment, the space requirements can be reduced further by virtue of the fact that the transport means is designed as a mold carrier carriage that moves below the sintering furnace and the at least one cooling chamber. This produces a rotary molding system with minimum floor space that utilizes the vertical space available in modern manufacturing facilities. The mold carrier carriage has a lifting device to move the mold carriers from below to the sintering furnace or the cooling chambers. Since the sintering furnace must be opened from below to admit the mold carrier, less heat escapes than would be the case if one of the other sides were opened. This proves to be another advantage of this embodiment. The system described offers the opportunity to process molds with different processing times in the same system since one mold carrier can overtake another during the process. As a result, optimum utilization of the system is guaranteed.

Another embodiment provides that the sintering furnace is mounted to be rotatable by means of a second rotating device, with a second rotational axis provided by the second rotational device and a first rotational axis determined by the first rotational device that receives the mold carrier not extending parallel. The mold carrier thus performs a rotary movement as a result of its own rotation and the rotation of the sintering furnace, in the sintering furnace, which produces an optimum distribution of the molten powder inside the hollow mold held by the mold carrier.

To receive the mold carrier, the first rotary devices of the sintering furnace and/or the cooling chambers have clamping elements that engage opposite sides of the mold carrier and are displaceable on extensions of the first rotary axes, especially pneumatically, in order to grip or release the mold carrier. At least one of the two clamping elements is driven by an electric motor to rotate the mold carrier. To produce a connection between this clamping element and the mold carrier that depends upon torque, the clamping element has projections and/or recesses located endwise that engage matching recesses and/or projections on the mold carrier to transfer the torque.

In addition, the mold carrier carriage also has a rotary device to keep the mold carrier rotating during its transport from the sintering furnace to the cooling chambers.

The invention will now be described in greater detail with reference to the embodiments shown in the figures.

BRIEF DESCRIPTION OF THE DRAWING

In the figures, unless indicated to the contrary, the same reference numerals refer to the same parts with the same meanings.

DESCRIPTION OF THE PREFERRED EMBODIMENTS

Figure 1:
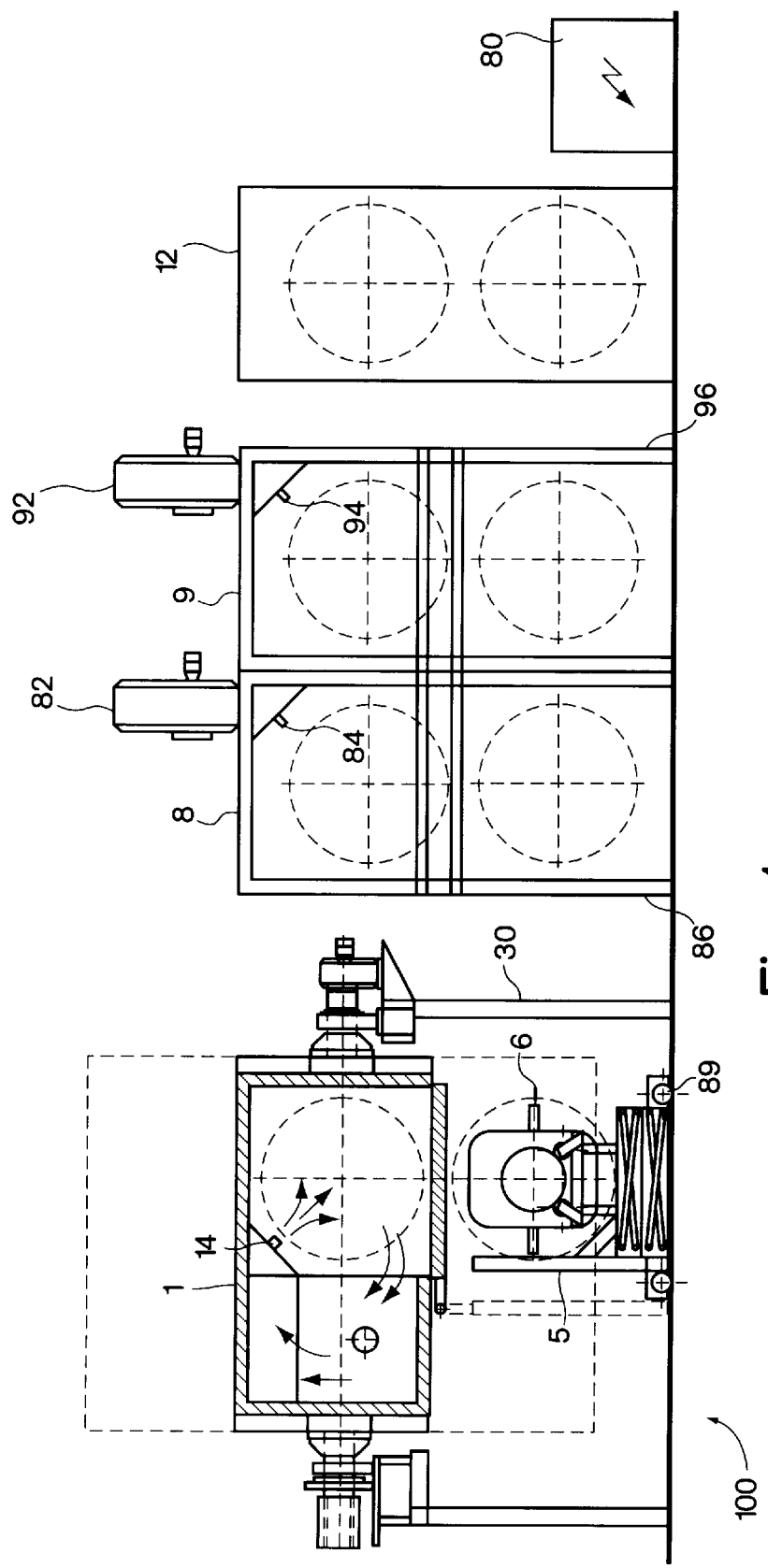
FIG. 1 is a rotary molding device according to the invention in a side view.
Figure 2:
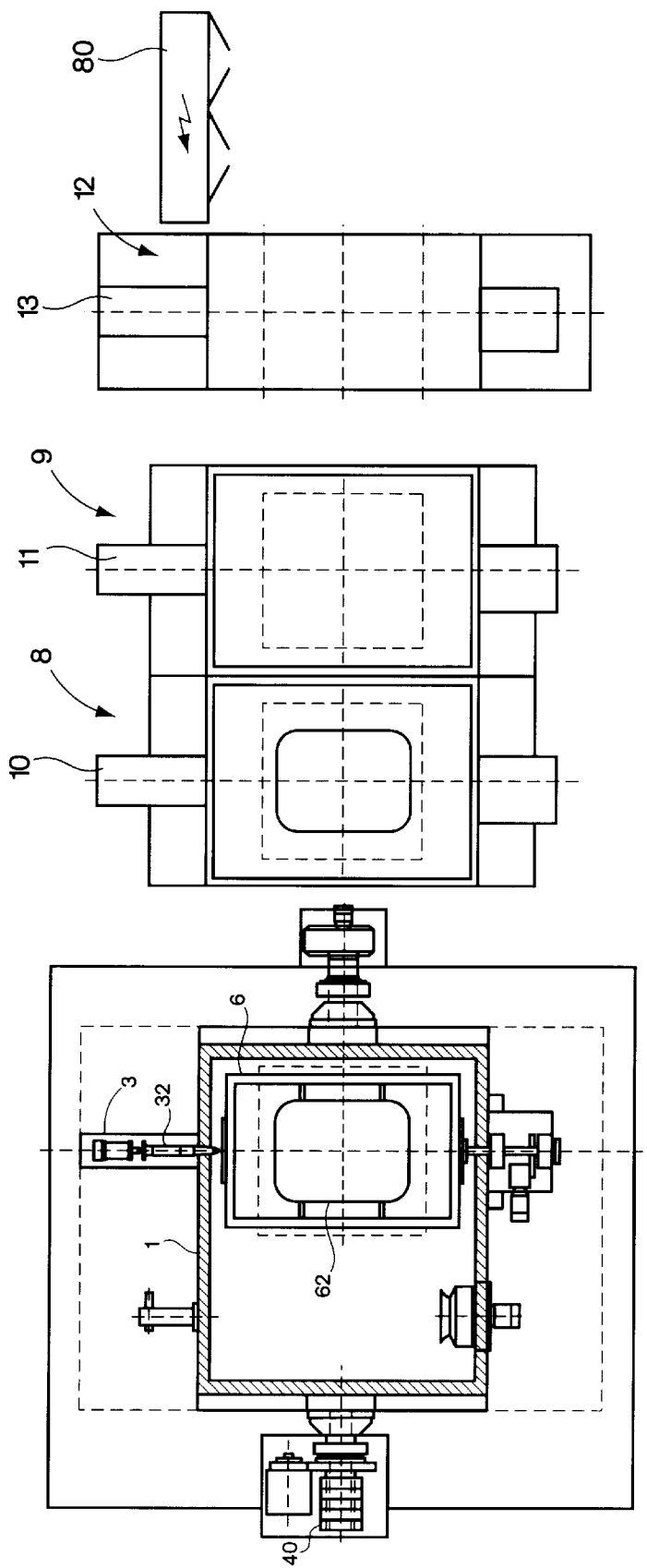
FIG. 2 is the rotary molding device according to FIG. 1 in a top view.

FIGS. 1 and 2 show a rotary molding system according to the invention in a side view (FIG. 1) and top view (FIG. 2). The rotary molding system has a sintering furnace 1 and two cooling chambers 8 and 9 located in series with said furnace. A station 12 for removal from the mold is located in series as well, said station serving to prepare new mold carriers and to remove the mold carriers and/or the hollow molds from the mold after the cooling process is complete. For the sake of completeness, a control panel 80 is shown that contains the electronics required to control the system.

Sintering furnace 1, cooling chambers 8, 9 and station 12 for removal from the mold have first rotary devices 3, 10, 11, 13 for rotatably receiving a mold carrier 6 that supports the hollow molds required for making plastic objects. The design and function of the identical first rotary devices 3, 10, 11, and 13 is shown in detail in conjunction with the first rotary device of sintering furnace 1 in FIGS. 4 and 5.

Sintering furnace 1 and cooling chambers 8, 9 are mounted on supports 30, 86, 96, with a mold carrier carriage 5 that serves to transport mold carrier 6 between station 12 for removal from the mold, sintering furnace 1, and cooling chambers 8, 9, traveling on rails 100 below the sintering furnace and cooling chambers 8, 9. Mold carrier carriage 5 has wheels 58 that engage rails 100 and a lifting device not shown in greater detail in FIGS. 1 and 2, by means of which device mold carrier 6 can be moved from below into sintering furnace 1 and/or cooling chambers 8, 9 and can be removed from them again after the sintering and/or cooling process is complete. The circles drawn in dot-dashed lines in FIG. 1 and/or the rectangle formed by dot-dashed lines in FIG. 2 indicate the position of a mold carrier with maximum dimensions below and/or inside sintering furnace 1 and cooling chambers 8, 9 as well as in station 12 for removal from the mold.

Blowers 82, 92 are mounted on cooling chambers 8, 9, said blowers drawing in air that is blown through air outlet nozzles 84, 94 into the interiors of cooling chambers 8, 9 for cooling a mold carrier.

Figure 3:
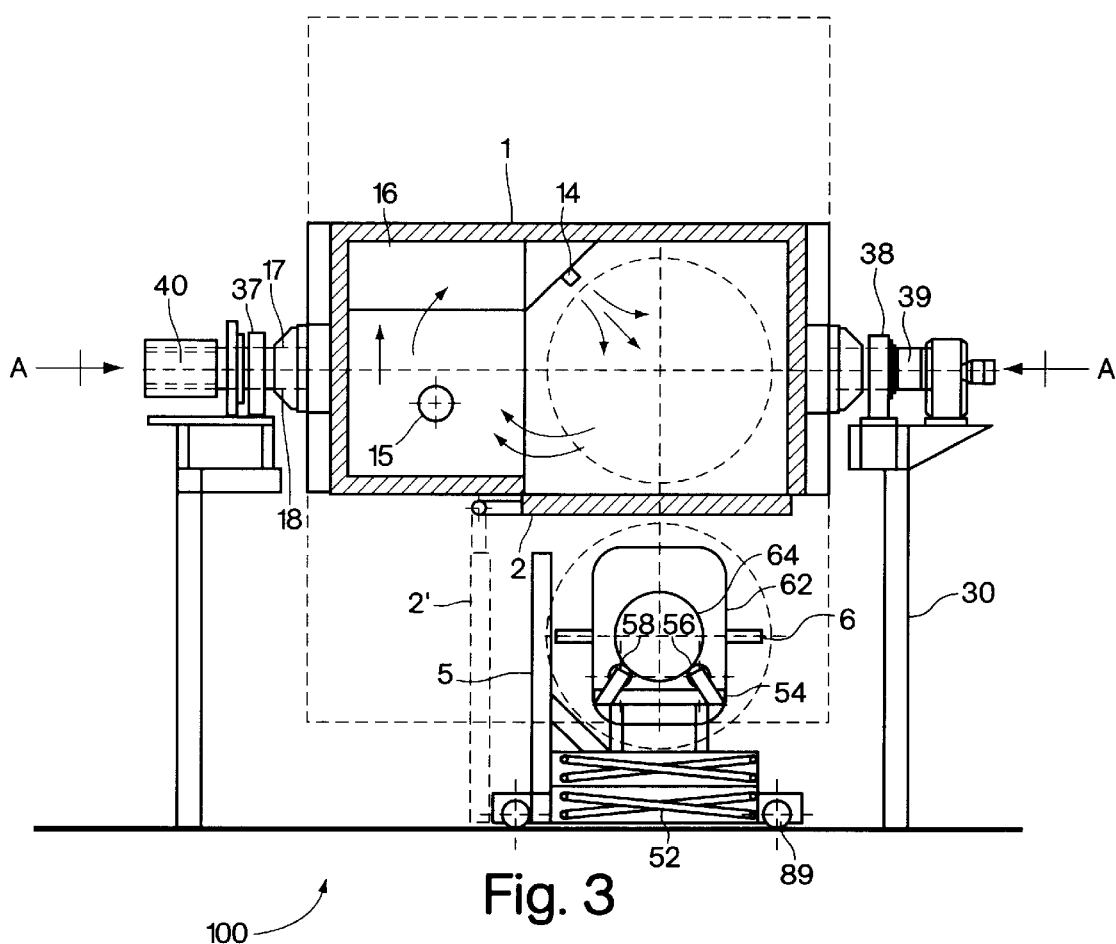
FIG. 3 is a side view of the sintering furnace of the rotary molding system according to the invention.
Figure 4:
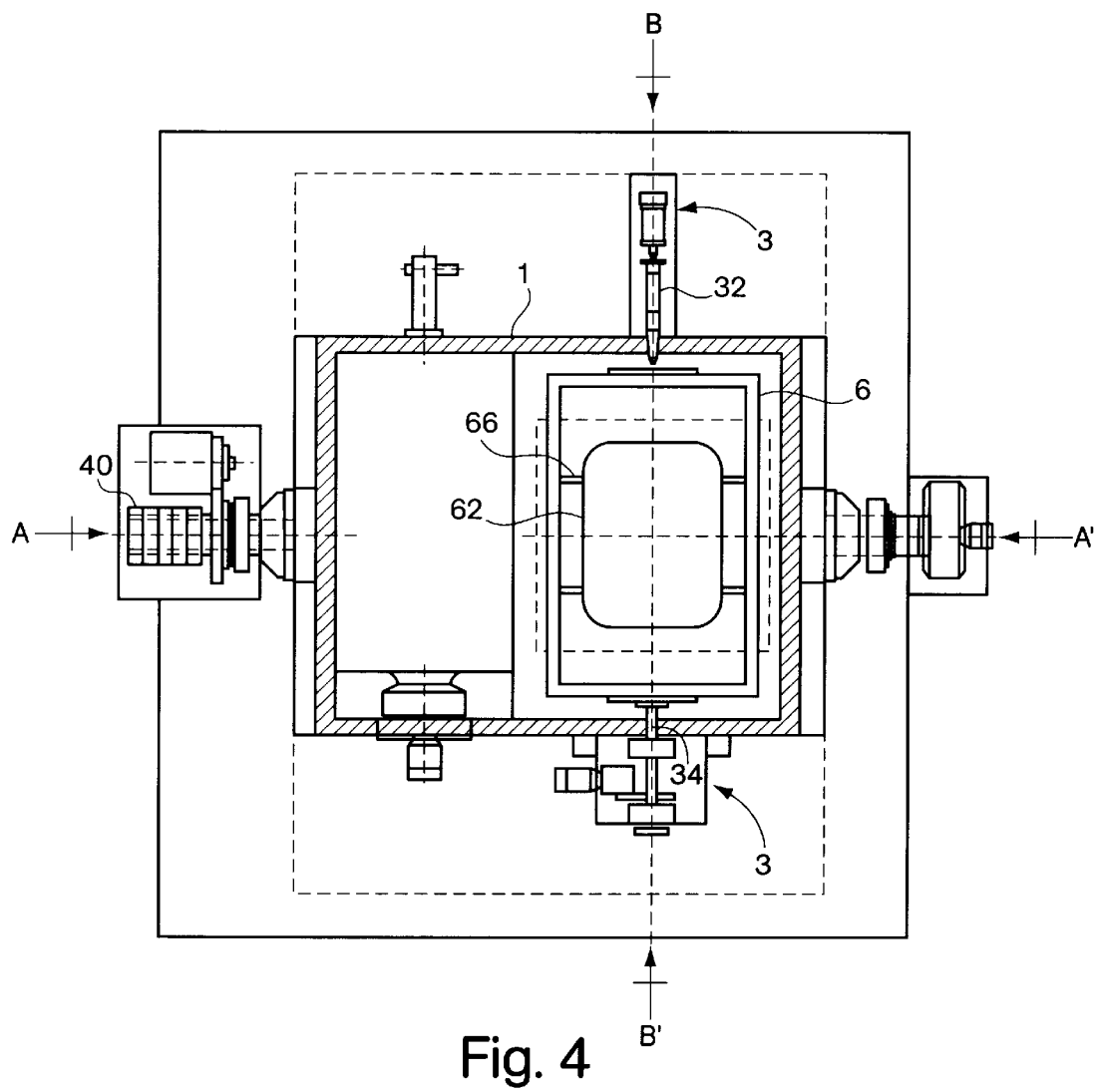
FIG. 4 is a top view of the sintering furnace of the rotary molding system according to the invention.
Figure 5:
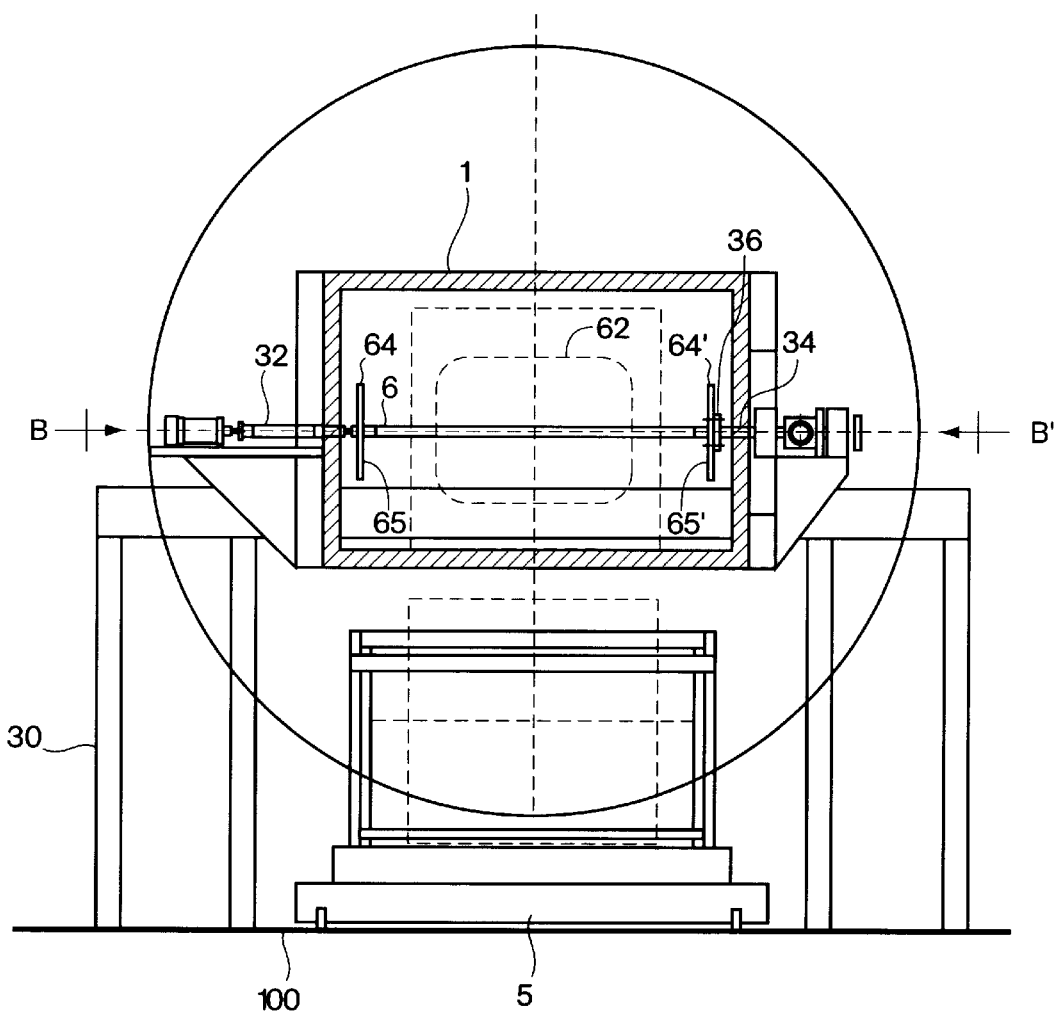
FIG. 5 is a side view of the sintering furnace of the rotary molding system according to the invention.

FIGS. 3 to 5 show a detailed view of sintering furnace 1 and the device supporting said furnace in two side views and in a top view, with a mold carrier 6 being on mold carrier carriage 5 outside sintering furnace 1 in FIG. 3 and inside sintering furnace 1 in FIGS. 4 and 5.

Figure 6:
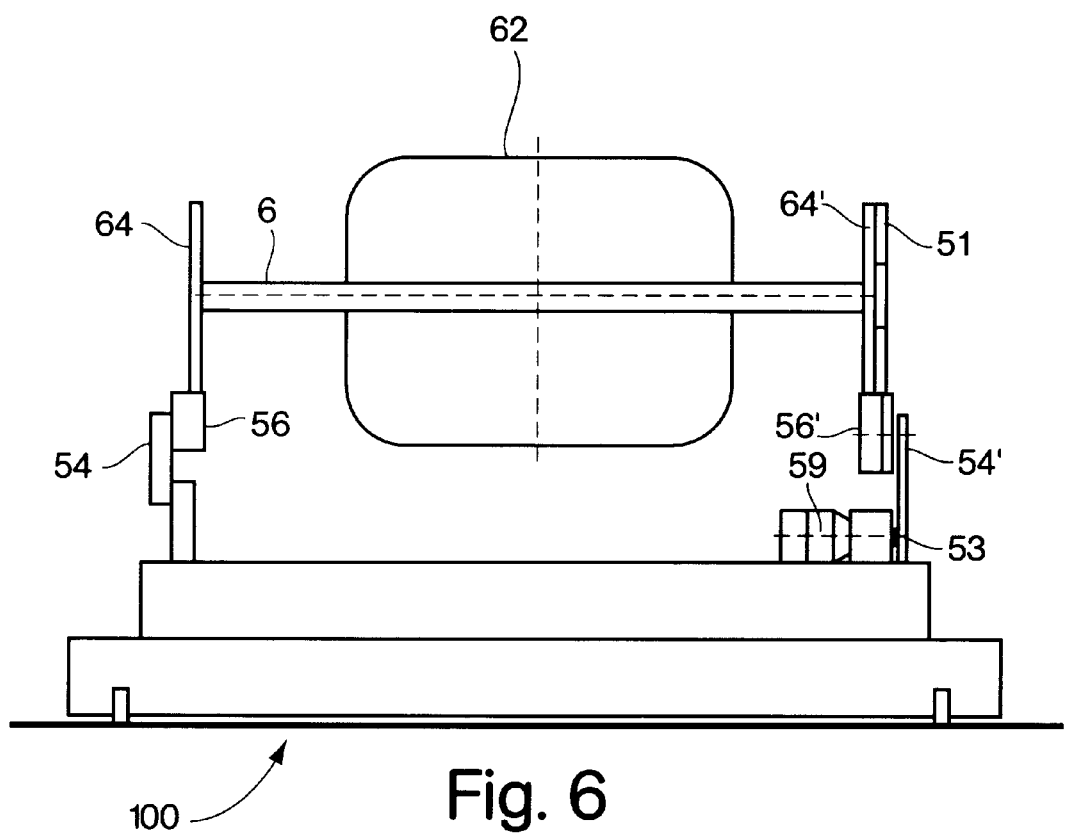
FIG. 6 is a side view of the mold carrier carriage with the mold carrier.

In the examples shown, mold carrier 6 consists of a rectangular frame in which a hollow mold 62 is held by braces 66. On each of two opposite sides, a circular disk 64, 64' is mounted that serves for rotatable mounting of mold carrier 6 on four rollers 56, 56' of mold carrier carriage 5. FIG. 6 shows a side view of a mold carrier 6 that is placed on mold carrier carriage 5. Mold carrier carriage 5 has a rotary device to perform a rotary movement of mold carrier 6 on rollers 56, 56'. The rotary device of mold carrier carriage 5 has a drive motor 59 that drives one of rollers 56' by a chain 53, said roller being one of the rollers on which mold carrier 6 rests by means of disks 64, 64'. At the same time, chain 53 engages a chainwheel 51 mounted as part of mold carrier 6 adjacent to disk 64' and permanently connected with said disk in order to set mold carrier 6 rotating. Mold carrier carriage 5 also has a lifting device 52 to raise mold carrier 6 from below into sintering furnace 1 and to remove it therefrom.

An opening in sintering furnace 1 for inserting or removing mold carrier 6 can be closed by means of a flap 2, 2' operated by an electric motor, said flap being shown in FIG. 3 in closed position (2) and open position (2').

Sintering furnace 1 has a rotary device 3 to receive mold carrier 6, with rotary devices 10, 11, 13 matching this rotary device 3 being provided in cooling chambers 8, 9 and station 12 for removal from the mold shown in FIGS. 1 and 2. Rotary device 3 has first and second clamping elements 32, 34 displaceable, especially pneumatically, along a first rotational axis B–B', said elements serving to receive mold carrier 6. Second clamping element 34 has a disk-shaped element 36 with projections located endwise, said projections engaging matching recesses 65 in disk 64' of mold carrier 6 to produce a torque connection. Chainwheel 51 explained in FIG. 6 has been omitted for the sake of clarity from FIGS. 4 and 5. Chainwheel 51 has a recess allowing disk-shaped element 36 to engage disk 64'. Second clamping element 34 is driven by an electric motor to cause mold carrier 6 to perform a rotary movement around rotational axis B–B', following establishment of a torque connection with second clamping element 34. First clamping element 32 fits endwise into a recess 65 of circular disk 64 of mold carrier 6 to hold mold carrier 6 together with second clamping element 34.

In the following, the insertion and removal of mold carrier 6 into and from sintering furnace 1 will be described briefly.

Mold carrier 6 is brought beneath already-open sintering furnace 1 by means of mold carrier carriage 5. Mold carrier 6 is raised by means of lifting device 52 until it is at a level at which clamping elements 32, 34 can grip matching recesses 65, 65' of mold carrier 6. Clamping elements 32, 34 are then pressed pneumatically in the axial direction against mold carrier 6, with first clamping element 32 engaging matching recess 65 in mold carrier 6. This is followed by rotation of second clamping element 34 until the projections of end disk 36 engage recesses 65' of mold carrier 6. Mold carrier 6 is held by the two clamping elements 32, 34, lifting device 52 is lowered, and flap 2 is closed. After the melting process is complete, flap 2 is opened, and lifting device 52 is extended until the two disks 64, 64' of mold carrier 6 rest on rollers 56, 56' of holding device 54, 54' of mold carrier carriage 5. Clamping elements 32, 34 are retracted as mold body 6 rotates to release mold carrier 6. The rotary movement of mold carrier 6 is produced by the rotational device of mold carrier carriage 5 that is powered by an electric motor, with lifting device 52 of said carriage being lowered to remove mold carrier 6 and with said carriage delivering mold carrier 6 to one of cooling chambers 8, 9 while rotating. The insertion and removal of mold carrier 6 into and from cooling chambers 8, 9 takes place from below, corresponding to the process of insertion into sintering furnace 1, with mold carrier 6 being kept rotating during the cooling process by first rotary devices 10, 11 which correspond in function and design to first rotary device 3 of sintering furnace 1.

During the melting and/or cooling processes, mold carrier carriage 5 is free to move over the entire length of the rotary molding system and can travel to any of the stations in the rotary molding system. With two cooling chambers 8, 9 occupied, a new mold carrier can be fetched from station 12 for removal from the mold for example, and delivered to sintering furnace 1.

In station 12 for removal from the mold, mold carrier 6 is likewise coupled by means of a pneumatically actuated clamping device to first rotary device 13 driven by an electric motor, and is rotated by device 13 into a position suitable for removal of the end product. Then the molds are again filled with material and delivered to the sintering furnace by means of mold carrier carriage 5.

The operation of sintering furnace 1 is especially evident from FIG. 3. Sintering furnace 1 is mounted on supports 30 and mounted to rotate around a second axis of rotation A–A' by means of a shaft 39 driven by an electric motor. Shaft 39 is mounted on bearings 37, 38. As a result of the overlapping rotary movements of sintering furnace 1 around second rotational axis A–A' and of mold carrier 6 around first rotational axis B–B', said axis extending perpendicularly to the second rotational axis A–A' in the examples shown, a rotary movement of the hollow mold is obtained that results in optimum distribution of the melted powder during the melting process inside hollow mold 66. A burner with a burner tube 15 to heat the interior of the furnace using a gas flame is located inside sintering furnace 1. An air duct 16 with air outlet nozzles 14 provides air circulation inside the sintering furnace. Gas and air are supplied by supply lines 17, 18 indicated by the dashed lines in FIG. 3 inside shaft 39 that supports sintering furnace 1.

Preferably a total of three mold carriers 6 is available. Mold carrier carriage 5 with its lifting device 52 is controlled in such fashion that optimum production and smooth transport of the mold carriers between sintering furnace 1, cooling chambers 8 and 9, and station 12 for removal from the mold is guaranteed.

What is claimed is:

1. A rotary molding system, comprising;
   at least one mold carrier;
   a sintering furnace having a first rotary device which releasably supports the mold carrier for rotation about a first axis of the mold carrier;
   at least one cooling chamber having a second rotary device which releasably supports the mold carrier for rotation about the first axis; and
   at least one transport device which receives the mold carrier released from one of the sintering furnace and the at least one cooling chamber and releasably supports the mold carrier for transporting the mold carrier between the sintering furnace and the at least one cooling chamber.

2. The rotary molding system according to claim 1, further comprising:
   at least two cooling chambers, wherein the sintering furnace and the at least two cooling chambers are arranged in series.

3. The rotary molding system according to claim 1, wherein the transport device is designed as a mold carrier carriage which moves below the sintering furnace and the at least one cooling chamber.

4. The rotary molding system according to claim 1 further comprising:
   a mold removal station located in series with the sintering furnace and the at least one cooling chamber, said mold removal station having a third rotary device which releasably supports the mold carrier for rotation about the axis of the mold carrier.

5. The rotary molding system according claim 1, further comprising:
   a fourth rotary device supporting the sintering furnace for rotation about a second rotational axis, wherein the second rotational axis and the first axis of the mold carrier in the sintering furnace are not parallel to one another.

6. The rotary molding system according to claim 1, wherein the first, the second and the third rotary devices each comprise first and second clamping elements which releasably engage with opposite sides of the mold carrier, with the opposite sides located on extensions of the first axis of the mold carrier.

7. The rotary molding system according to claim 6, wherein at least one of the clamping elements has projections or recesses located endwise and adjacent to one another and engages with matching recesses or projections disposed on the mold carrier to transfer torque.

8. The rotary molding system according to claim 3, wherein the mold carrier carriage further comprises a rotary device to rotate the mold carrier during transport.

9. The rotary molding system according to claim 3, the mold carrier further comprising disks secured to opposite sides of the mold carrier, the transport device comprising rollers rotatably secured to the mold carrier carriage and supporting said disks.

10. The rotary molding system of claim 9, further comprising drive means for rotating the mold carrier in the mold carrier carriage.

11. The rotary molding system of claim 1, wherein the sintering furnace receives the mold carrier from the transport device through a closeable opening disposed at a bottom portion of the sintering furnace.

12. A rotary molding system comprising:
   at least one mold carrier;
   a sintering furnace comprising a rotary device which releasably engages with the mold carrier, wherein the mold carrier rotates about an axis in the sintering furnace; and
   at least one transport device which removes, through an opening disposed at a bottom of the sintering furnace, the at least one mold carrier released from the sintering furnace and releasably supports the mold carrier for transport.

* * * * *